United States Patent
Wang et al.

(10) Patent No.: US 6,192,010 B1
(45) Date of Patent: Feb. 20, 2001

(54) APPARATUS AND METHOD FOR ADJUSTING THE PICKUP HEAD OF AN OPTICAL DISC DRIVE TO OPTIMAL FOCUS POINT

(75) Inventors: Sheng-Yunn Wang, Tai-Ping; Ching-Jiang Hsieh, Hsinchu, both of (TW)

(73) Assignee: Media Tek Inc., Hsinchu City (TW)

(*) Notice: Under 35 U.S.C. 154(b), the term of this patent shall be extended for 0 days.

(21) Appl. No.: 09/056,162

(22) Filed: Apr. 6, 1998

(30) Foreign Application Priority Data

Feb. 13, 1998 (TW) .................................. 87102002

(51) Int. Cl.$^7$ ...................................... G11B 7/00
(52) U.S. Cl. .......................... 369/44.29; 369/54
(58) Field of Search ..................... 369/44.29, 54

(56) References Cited

U.S. PATENT DOCUMENTS

| | | | |
|---|---|---|---|
| 5,610,886 | * 3/1997 | Hayashi et al. | 369/44.29 |
| 5,627,807 | * 5/1997 | Abe | 369/44.29 |
| 5,751,674 | * 5/1998 | Bradshaw et al. | 369/44.29 X |
| 5,808,093 | * 9/1998 | Tsutsui et al. | 369/44.29 |
| 5,828,636 | * 10/1998 | Matsumoto et al. | 369/44.29 X |
| 5,986,985 | * 11/1999 | Kawamura et al. | 369/44.29 X |

* cited by examiner

*Primary Examiner*—Aristotelis M. Psitos
(74) *Attorney, Agent, or Firm*—Thomas, Kayden, Horstemeyer & Risley

(57) ABSTRACT

An apparatus and method is provided for use on the pickup head of an optical disc drive for the purpose of adjusting the pickup head to the optimal focus point through a featured tree-structured search algorithm. The apparatus and method can perform the adjustment automatically so as to eliminate the need to use laborious work to make the adjustment in manufacture. The apparatus is activated each time the optical disc drive is started so as to offset the unbalanced condition in the focusing error signal, which allows the optical disc drive to perform the access operation more reliably. Moreover, the apparatus is realized in a digital manner that allows easy implementation and a low manufacturing cost.

7 Claims, 3 Drawing Sheets

APPARATUS AND METHOD FOR ADJUSTING THE PICKUP HEAD OF AN OPTICAL DISC DRIVE TO OPTIMAL FOCUS POINT

CROSS-REFERENCE TO RELATED APPLICATION

This application claims the priority benefit of Taiwan application serial no. 87102002, filed Feb. 13, 1998, the full disclosure of which is incorporated herein by reference.

BACKGROUND OF THE INVENTION

1. Field of the Invention

This invention relates to optical disc drives, and more particularly, to an apparatus and method for use on the pickup head of an optical disc drive for the purpose of adjusting the pickup head to an optimal focus point through a tree-structured search algorithm.

2. Description of Related Art

The optical disc is a mass storage medium that can hold up to several megabits or even gigabits of binary data in a single piece of plastic disc, which is several times larger than a conventional magnetic disk can hold. Due to its high capacity, the optical disc is now widely used in the computer arena as the major data storage medium.

An optical disc drive is composed of a large number of constituent parts including motors and optical and electronic components. In operation, the characteristics of these constituent parts can change in time and be affected by various environmental conditions. The changes in the characteristics can then affect the gain of the servo control. loop for focusing/tracking control of the pickup head of the optical disc drive. Moreover, the gain can be further affected by changes in the optical properties of the photo sensors and the reflectivity of the optical disc being used. Therefore, the gain of the servo control loop should be always adaptively adjusted to compensate for any changes in the system characteristics before being put into actual operation so as to allow the optical disc drive to operate without errors in focusing and tracking.

In conventional optical pickup heads, a laser diode is used to generate a laser beam which is directed at the data area on the optical disc. Then, the reflections of the laser beam from the surface of the optical disc are detected by a specially designed photo sensor that can generate opto-electrical signals indicative of the focusing/tracking errors in the pickup head. The photo sensor includes a number of separate light-sensitive areas, typically six, with four of them being used to generate the focusing error (FE) signal and two of them being used to generate the tracking error (TE) signal. When illuminated by the reflections from the optical disc, these six light-sensitive areas will each produce an opto-electrical signal whose amplitude is proportional to the intensity of the light spotted thereon. Through current-to-voltage conversion means and preamplifiers, these opto-electrical signals can be transformed into the FE signal, the TE signal and the RF (radio frequency) signal. The FE/TE signals can then be used in a servo feedback control means to adjust the pickup head to the correct focusing and tracking positions.

FIG. 1 is a graph used to depict the relationship between focus bias and the amplitude of the resultant RF signal. In operation, it is desired that the focus bias be made as close to zero as possible. As shown in FIG. 1, the amplitude of the RF signal is at the maximum amplitude (point a) when the focus bias is exactly zero, and decreases with the increase in the focus bias. Ideally, the FE signal should be well balanced, just like the waveform illustrated in FIG. 2A. However, due to some inconsistency in the reflectivity of the photo sensors and the gain of the pre-amplifiers, the FE signal can be unbalanced as illustrated by the waveform in FIG. 2B.

In operation, it is desirable to position the pickup head at the focus point where the focus bias is exactly or very close to zero, which allows the amplitude of the RF signal to be at the maximum. Two conventional methods have been proposed for this purpose. The first method is through manual adjustment in manufacture. This method, however, is quite laborious and time-consuming, and thus very cost-ineffective.

The second method is disclosed in the U.S. Pat. No. 5,610,886, "FOCUS BALANCE AUTOMATIC ADJUSTING DEVICE AND AUTOMATIC ADJUSTING METHOD" to Hayashi et al.

Assume the pickup head is initially located at the point b (which is deviated from the optimal focus point a) due to the unbalanced condition of the FE signal as illustrated in FIG. 2B. This patent first uses the point b as a center point and defines a pair of focus bias points respectively on both sides of the center point, then compares the amplitudes of the RFRP signals resulted from these two focus bias points with the maximum amplitude at the optimal focus point a. The focus bias point that has the minimum difference is subsequently used as the center point for the next search. This procedure is repeated until the pickup head is substantially positioned at the optimal focus point a.

One drawback to the foregoing patent, however, is that if the initial focus bias point is very far away from the optimal focus point a, for example at the point c in FIG. 1, the procedure for finding the optimal focus point a becomes very time-consuming, causing the access time to be lengthy.

As a summary, the conventional manual adjustment method is quite laborious and time-consuming to carry out, which causes the manufacture to be highly cost-ineffective. Although the Hayashi patent can perform the adjustment automatically and fast, the access time can be lengthy and that will cause the read operation to be slow.

SUMMARY OF THE INVENTION

It is therefore an objective of the present invention to provide an improved apparatus and method for use on the pickup head of an optical disc drive to adjust the pickup head to the optimal focus point, which can perform the adjustment automatically so as to eliminate the need to use laborious work to make the adjustment in manufacture.

It is another an objective of the present invention to provide an improved apparatus and method for use on the pickup head of an optical disc drive to adjust the pickup head to the optimal focus point, which utilizes a tree-structured search algorithm that can perform the search for the optimal focus point more quickly, and which can be digitally implemented so that the adjustment is more efficient and allows the manufacturing process to be more cost-effective.

It is still another objective of the present invention to provide an improved apparatus and method for use on the pickup head of an optical disc drive to adjust the pickup head to the optimal focus point, which can allow the pickup head to always be focused to the optimal focus point.

In accordance with the foregoing and other objectives of the present invention, an improved apparatus and method is provided for use on the pickup head of an optical disc drive for the purpose of adjusting the pickup head to an optimal focus point through a tree-structured search algorithm.

The apparatus of the invention includes the following constituent elements: a means for generating a focusing error signal and an RF signal indicative of the current focus point of the pickup head; an RFRP circuit, coupled to receive the RF signal, for generating an RFRP signal indicative of the difference between the maximum amplitude and minimum amplitude of the RF signal; a signal processor, coupled to said RFRP circuit, for detecting the amplitude of the RFRP signal; and a level bias circuit, coupled to said signal processor, for generating a predetermined number of focus bias points, with each neighboring pair of said focus bias points being separated by a predetermined bias. The said level bias circuit sends said focus bias points in a successive manner to thereby allow said signal processor to find the focus bias point which has the maximum RFRP signal and then uses the focus bias point to replace the previous one, which procedure is repeatedly performed until the optimal focus point is found.

The method of the invention includes the following steps: (1) locating the initial focus point of the pickup head and find the current bias at the initial focus point; (2) obtaining a predetermined number of focus bias points with the current focus point as center point and each neighboring pair of the focus bias points being separated by a division of the current bias; (3) adjusting the pickup head to each of the focus bias points to thereby obtain the RFRP signal of each of the focus bias point; and then finding the focus bias point that has the maximum RFRP signal; (4) checking whether the current bias is still divisible; if yes, replacing the previous focus point with the focus bias point that has the maximum RFRP signal and the previous bias with the current bias, and then repeating said steps (2) through (4); and (5) if the current bias is no longer indivisible, using the current focus bias point as the optimal focus point.

In conclusion, the apparatus and method of the invention for adjusting the pickup head to the optimal focus point has the following advantages over the prior art. First, the invention utilizes a tree-structured search algorithm that allows the pickup head to be adjusted to the optimal focus point, with a considerably faster completion time as compared to the prior art. Second, the invention is performed each time the optical disc drive is started so as to offset the unbalanced condition in the focusing error signal, which allows the optical disc drive to perform the access operation more reliably. Third, the invention is realized in a digital manner that allows easy implementation and low manufacturing cost.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 3:
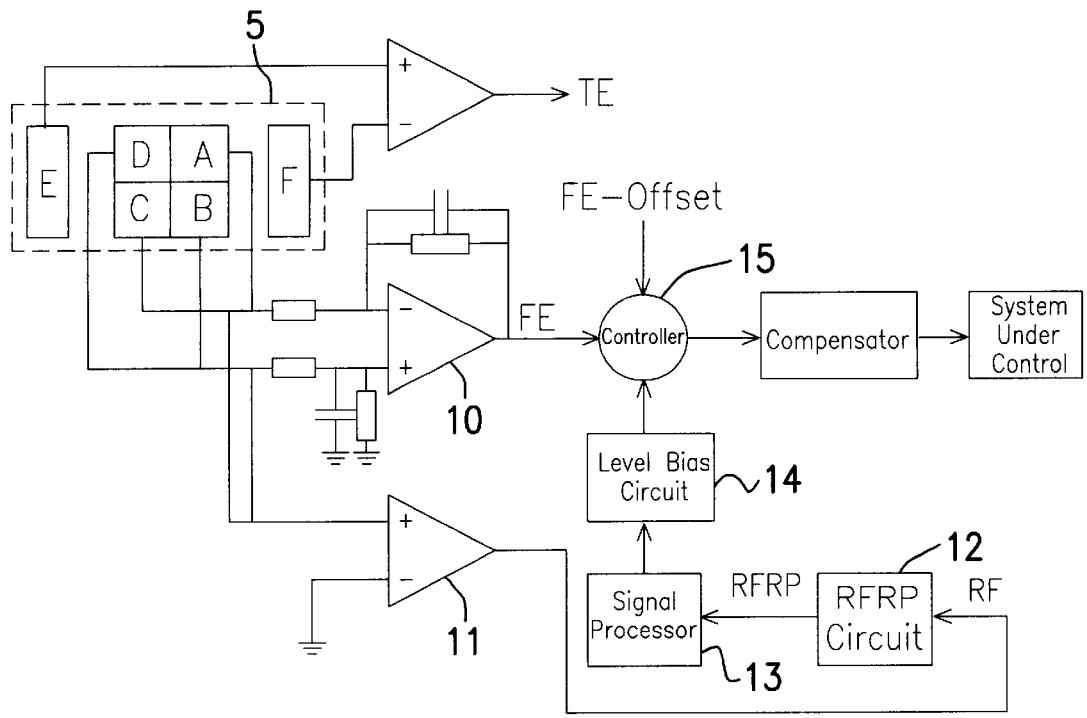
FIG. 3 is a schematic block diagram of the apparatus according to the invention which is devised for use on the pickup head of an optical disc drive for the purpose of adjusting the pickup head to the optimal focus point.

FIG. 3 is a schematic block diagram of the apparatus according to the invention which is devised for use on the pickup head of an optical disc drive for the purpose of adjusting the pickup head to the optimal focus point. As shown, the apparatus includes a photo sensor 5, a first amplifier 10, a second amplifier 11, an RFRP circuit 12, a signal processor 13, a level bias circuit 14 and a controller 15. The photo sensor 5 includes six light-sensitive areas whose output opto-electrical signals are respectively designated by A, B, C, D, E, and F. The FE signal is taken from the output of the first amplifier 10 which amplifies the composite signal (A+C)−(B+D). Further, the RF signal is taken from the output of the second amplifier 11 which amplifies the composite signal (A+B+C+D).

The RFRP circuit 12 will then detect the peak (maximum amplitude) and bottom (minimum amplitude) of the RF signal to thereby generate an RFRP signal indicative of the difference between the maximum amplitude and minimum amplitude of the RF signal multiplied by a gain.

Figure 4:
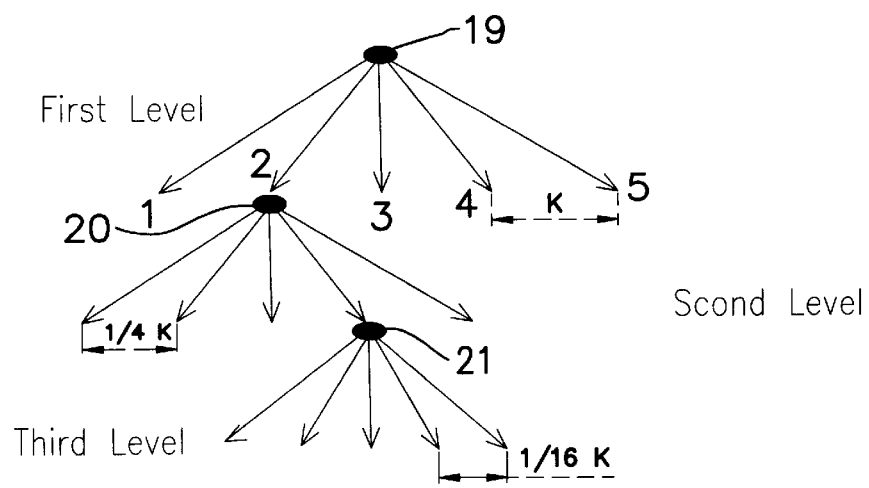
FIG. 4 is a schematic diagram used to explain the tree-structured search algorithm used by the apparatus and method of the invention to search for the optimal focus point.

FIG. 4 is a schematic diagram showing the tree-structured search algorithm used by the apparatus and method of the invention to search for the optimal focus point. In FIG. 4, assume that the point indicated by the reference numeral 19 is the initial focus point of the optical pickup head. Referring also to FIG. 3, in the first step, the level bias circuit 14 uses the initial focus point 19 as a center point to generate a predetermined number of focus bias points N, with each neighboring pair of focus bias points being separated by a predetermined bias K. These focus bias points are symmetric about the center point. Assume N=5. Each focus bias point corresponds to an RFRP signal with a specific amplitude.

Subsequently, the signal processor 13 detects the amplitude of the RFRP signal of each of the five focus bias points and then find which one of the five focus bias points has the maximum RFRP signal. In the case of FIG. 4, for example, assume the point indicated by the reference numeral 20 is the focus bias point with the maximum RFRP signal. The level bias circuit 14 then replaces the previous focus point (i.e., the initial focus point 19) with this focus bias point 20 as the center point to repeat the foregoing procedure again. This procedure is performed repeatedly until the bias is no longer divisible. When this is the case, it indicates that the optical pickup head has been positioned at the optimal focus point.

Figure 2A:
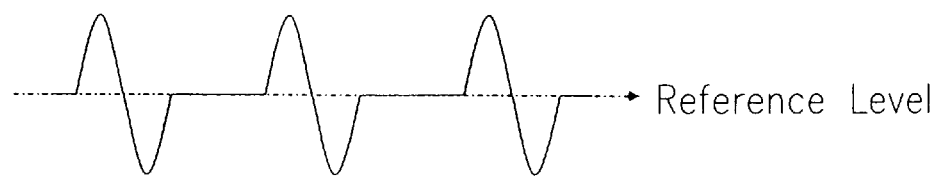
FIG. 2A is a waveform diagram showing the waveform of a balanced focusing error signal.
Figure 2B:
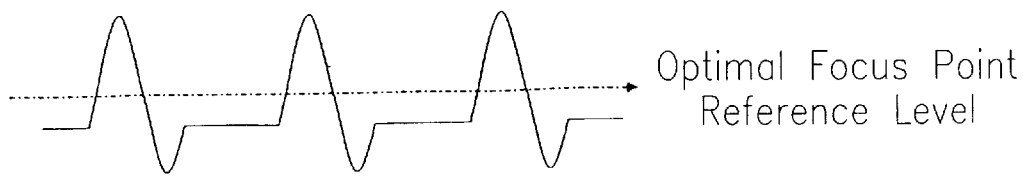
FIG. 2B is a waveform diagram showing the waveform of an unbalanced focusing error signal.

On the other hand, an FE-Offset value is input to the controller 15. The controller 15 then offsets the reference level $V_{ref}$ of the FE signal (see FIG. 2B) with the FE-offset value so as to offset the DC component of the FE signal.

When there is no bias input, it can be learned from the closed-loop control theory that the controller 15 will perform the procedure repeatedly until the FE signal is zero, i.e., until the optical pickup head has reached at the zero-crossing point. However, when the FE signal is unbalanced as that shown in FIG. 2B, the controller 15 will adjust the optical pickup head from the reference level $V_{ref}$, which is an incorrect point to position the optical pickup head.

Figure 1:
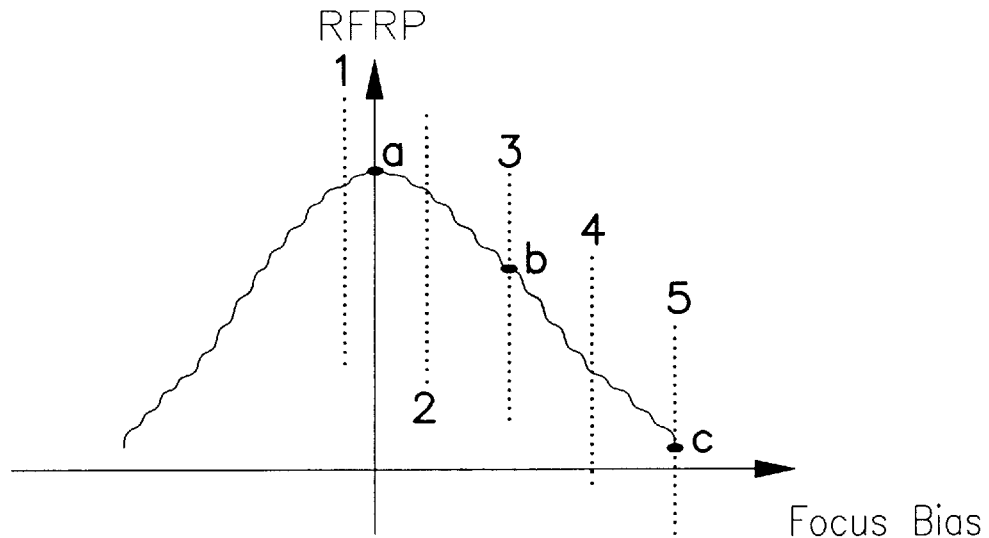
FIG. 1 is a graph used to depict the relationship between the focus bias and the amplitude of resultant RFRP signal.

Referring back to FIG. 1, if it is desirable to move the optical pickup head from the point b to the optimal focus point a, i.e., shifting the zero-crossing point from $V_{ref}$ (indicated by the solid line in FIG. 2B) to the optimal focus point (indicated by the dashed line), a bias must be added for the purpose of shifting the zero-crossing point ($V_{ref}$) to the optimal focus point.

Figure 5:
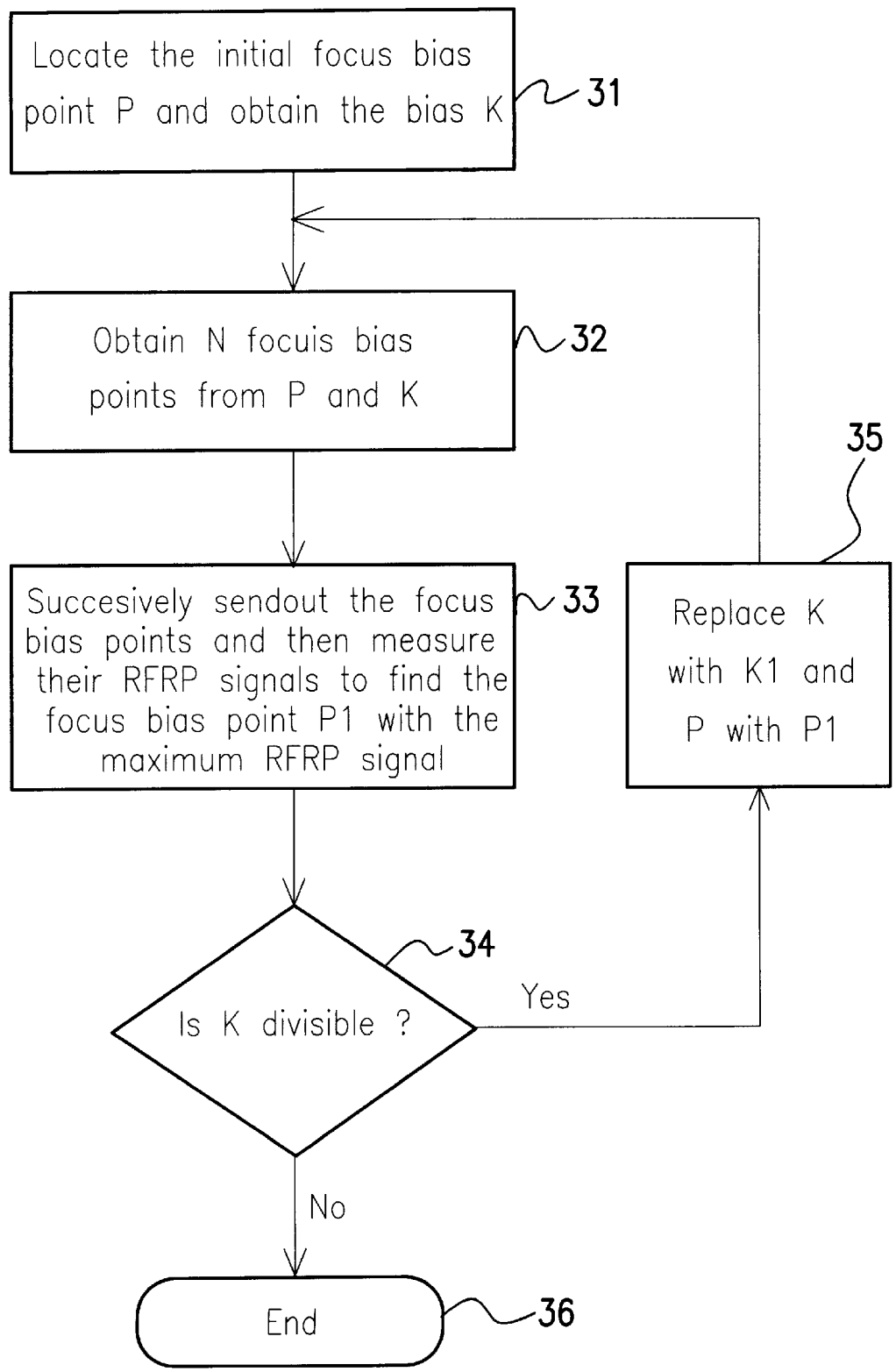
FIG. 5 is a flow diagram showing the steps involved in the method according to the invention for adjusting the pickup head to the optimal focus point.

The invention also provides a method for adjusting the optical pickup head to the optimal focus point through a tree-structured search algorithm. The procedural steps involved in this method are shown in the flow diagram of FIG. 5.

As shown, the first step 31 is to locate the initial focus point P of the optical pickup head (for example the focus point 19 shown in FIG. 4) and find the bias K. The bias K should be within the range that allows the algorithm to find the optimal focus point in the shortest time.

In the subsequent step 32, the initial focus point P is used as a center point about which N focus bias points, for example N=5, are devised, with each neighboring pair of focus bias points being separated by a distance equal to the bias K. The pickup head is then adjusted successively to each of these five focus bias points. Since the five focus bias points are all different in bias, the resultant RFRP signals are also all different in amplitude.

In the subsequent step 33, the RFRP signals resulted from positioning the pickup head respectively at the five focus bias points are compared to find which one has the maximum amplitude. The focus bias point that is associated with the maximum RFRP signal is then used as the center point (for example the focus point 20 in FIG. 4) for the next search.

In the subsequent step 34, the bias K for the new center point is checked to see if it is still divisible. If YES, the procedure goes to step 35; otherwise, the procedure goes to step 36 to end the adjustment.

In step 35, the bias K is divided by four (corresponding to N=5) to obtain a displacement of K1=K/4 to replace the previous value of K. Moreover, the new center point P1 is used to replace the current center point P. The procedure then goes back to step 32 so as to repeat steps 32 through 34 once again. Steps 32 through 34 are repeated again and again until K has reached the minimum value that is no longer divisible. This indicates that the optimal focus point has been reached. The procedure then goes to step 36 to end the adjustment.

It should be understood that the invention is not limited to the use of N=5, and N can instead be 2, 3, 7, and so forth. In the case of N=3, the separation between each neighboring pair of the three focus bias points is half of the previous one. As a general rule, in the case of N=n, the separation between each neighboring pair of the n focus bias points is 1/(n−1) of the previous one. The optimal value for N can be determined in advance through experiments.

Furthermore, the invention is devised in such a manner that, when the optical disc drive is started, then no matter whether the pickup head is already at the optimal focus point or not, the adjustment will be nevertheless performed lest the signal unbalance affect the system performance.

In conclusion, the apparatus and method of the invention for adjusting the pickup head to the optimal focus point has the following advantages over the prior art.

(1) First, the invention utilizes a tree-structured search algorithm that allows the pickup head to be adjusted to the optimal focus point, with a considerably faster completion time as compared to the prior art.

(2) Second, the invention is performed each time the optical disc drive is started so as to offset the unbalanced condition in the focusing error signal, which allows the optical disc drive to perform the access operation more reliably.

(3) Third, the invention is realized in a digital manner that allows easy implementation and low manufacturing cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An apparatus for use on an pickup head of an optical disc drive to adjust the pickup head to an optimal focus point, which comprises:

means for generating a focusing error signal and an RF signal indicative of current focus point of the pickup head;

a RFRP circuit, coupled to receive the RF signal, for generating a RFRP signal indicative of the difference between the maximum amplitude and minimum amplitude of the RF signal;

a signal processor, coupled to said RFRP circuit, for detecting the amplitude of the RFRP signal; and a level bias circuit, coupled to said signal processor, for generating a predetermined number of focus bias points, with each neighboring pair of said focus bias points being separated by a predetermined bias, said level bias circuit carries out a procedure that includes sending said focus bias points in a successive manner to said means for generating the focusing error signal and the RF signal thereby to allow said signal processor to find the focus bias point which has the maximum RFRP signal and then using the focus bias point to replace the previous one, which procedure is repeatedly performed until the optimal focus point is found, at which status said level bias circuit is no longer able to generate the predetermined number of the focus bias points.

2. The apparatus of claim 1, wherein the means for generating the focusing error signal and the RF signal comprises:

a first amplifier for amplifying the focusing error signal from the pickup head;

a second amplifier for amplifying a tracking error signal from the pickup head; and a controller for adjusting the pickup head to a zero-crossing point, where the focusing error signal is zero.

3. The apparatus of claim 2, wherein said pickup head comprises:

a laser diode for generating a laser beam to illuminate an optical disc; and a photo sensor for sensing the reflections from the optical disc.

4. The apparatus of claim 1, wherein the first focus bias point is the initial focus point of the pickup head.

5. A method for use on the pickup head of an optical disc drive to adjust the pickup head to an optimal focus point, which comprises:

(1) locating the initial focus point of the pickup head and finding the current bias at the initial focus point;

(2) obtaining a predetermined number of focus bias points with the current focus point as center point and each neighboring pair of the focus bias points being separated by a division of the current bias;

(3) adjusting the pickup head to each of the focus bias points to thereby obtain the RFRP signal of each of the focus bias point and then finding the focus bias point that has the maximum RFRP signal;

(4) checking whether the current bias is still divisible, wherein if it is, the previous focus point is replaced with the focus bias point that has the maximum RFRP signal and the previous bias is replaced with the current bias, and then said steps (2) through (4) are repeated;

(5) checking whether the current bias is no longer indivisible, wherein if it is not, using the current focus bias point as the optimal focus point.

6. The method of claim 5, wherein the first focus bias point is the initial focus point of the pickup head.

7. The method of claim 5, wherein the current bias is related to the previous bias as follows:

$$K2=K1/(n-1)$$

where K2 is the current bias, K1 is the previous bias and n is the predetermined number of the focus bias points.

* * * * *